United States Patent [19]

Little

[11] Patent Number: 5,275,233

[45] Date of Patent: Jan. 4, 1994

[54] APPARATUS FOR REMOVING MOISTURE FROM A HOT COMPRESSED GAS

[75] Inventor: Randal A. Little, Mocksville, N.C.

[73] Assignee: Ingersoll-Rand Company, Woodcliff Lake, N.J.

[21] Appl. No.: 9,503

[22] Filed: Jan. 25, 1993

[51] Int. Cl.$^5$ .................... F28B 1/06; F25D 17/06
[52] U.S. Cl. ................... 165/111; 165/113; 165/166; 165/176; 62/93
[58] Field of Search .............. 165/113, 111, 166, 176; 62/93

[56] References Cited

U.S. PATENT DOCUMENTS

| | | | |
|---|---|---|---|
| 3,041,842 | 7/1962 | Heinecke | 62/93 |
| 3,165,903 | 1/1965 | Roc et al. | 62/93 |
| 3,541,807 | 11/1970 | Henderson | 62/272 |
| 3,722,583 | 3/1973 | Fiedler | 165/156 |
| 3,739,594 | 6/1973 | Freese | 62/93 |
| 3,792,729 | 2/1974 | Perry | 165/76 |
| 3,797,565 | 3/1974 | Fernandes | 165/111 |
| 3,899,023 | 8/1975 | Zander et al. | 165/111 |
| 4,027,729 | 6/1977 | Bruhl | 165/111 |
| 4,193,443 | 3/1980 | Nanaumi et al. | 165/66 |
| 4,235,081 | 11/1980 | Dowling | 62/93 |
| 4,237,696 | 12/1980 | Coblentz | 62/93 |
| 4,249,596 | 2/1981 | Tutak et al. | 165/113 |
| 4,253,315 | 3/1981 | Fiedler | 62/404 |
| 4,287,724 | 9/1981 | Clark | 62/272 |
| 4,330,034 | 5/1982 | Lang et al. | 165/113 |
| 4,484,451 | 11/1984 | Darm | 62/93 X |
| 4,638,852 | 1/1987 | Basseen et al. | 165/47 |
| 4,671,856 | 6/1987 | Sears | 203/22 |
| 4,680,938 | 7/1987 | Caley | 62/93 |
| 4,905,476 | 3/1990 | Cinacchi | 62/93 |
| 4,918,939 | 4/1990 | Fresch et al. | 62/272 |
| 5,107,919 | 4/1992 | Basseen et al. | 165/113 X |

FOREIGN PATENT DOCUMENTS

| | | | |
|---|---|---|---|
| 78187 | 6/1980 | Japan | 62/93 |

*Primary Examiner*—John Rivell
*Assistant Examiner*—L. R. Leo
*Attorney, Agent, or Firm*—Victor M. Genco, Jr.

[57] ABSTRACT

An apparatus for removing moisture from a hot compressed gas before the gas is delivered to a work tool. The apparatus includes a unitary rigid structure composed of a central core, with a header mounted on each side of the core. The central core includes a recuperator section and an aftercooler section, and the headers define air passages whereby the air passing through the apparatus is first cooled in the recuperator section, further cooled in the aftercooler section, and then reheated in the recuperator section. A water separator is positioned at the location where the gas reaches its lowest temperature, and such that upon reheating, a relatively dry and hot gas may be delivered to the work tool.

22 Claims, 4 Drawing Sheets

APPARATUS FOR REMOVING MOISTURE FROM A HOT COMPRESSED GAS

BACKGROUND OF THE INVENTION

This invention relates generally to an apparatus for removing moisture from a hot compressed gas, and more particularly to such an apparatus which is particularly adapted for use with an air compressor which supplies compressed air to a separate work tool, such as a sand blast apparatus, for example.

It has long been recognized that it is desirable to dehumidify hot compressed gas leaving a compressor prior to the compressed air reaching an object of interest, such as a work tool. In this regard, prior dehumidification systems typically employ an aftercooler, which may be cooled by ambient air or a refrigeration system, and a water separator positioned to remove any condensed water from the cooled airstream. However, the use of an aftercooler leaves the possibility of condensation developing in the downstream piping, since the aftercooler typically supplies saturated compressed air at a temperature slightly above the ambient temperature. Therefore, any further cooling will result in further condensation formation, which may interfere with the operation of a downstream work tool or process. For example, in abrasive blasting, such as sand blasting, the presence of moisture in the compressed air flow to the work tool causes the abrasive mixture to clog and cake which reduces the efficiency of the abrasive blasting process.

It also has been proposed, especially with systems having long piping runs, to use a recuperator type heat exchanger to reheat the compressed air after it exits the aftercooler and drops its condensation. The recuperator takes the form of a separate heat exchanger located in conjunction with the aftercooler. This, however, results in a cumbersome configuration having two hoses between the aftercooler and the recuperator. Also, additional piping is required from the compressor to the recuperator and from the recuperator to the work tool being served with the dry compressed air. This known arrangement can become even more unwieldy if the water separator is mounted between the aftercooler outlet and the recuperator. With the required piping and large number of connections, the pressure drop of the compressed air, and the likelihood of leaks, is increased. Further, it is common for users to mismatch the size, flow rates, and power of the aftercooler and the recuperator, and to even reverse their proper order in the system.

The foregoing illustrates limitations known to exist in present dehumidification systems. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an apparatus for removing moisture from a hot compressed gas which includes first and second headers, the first header including a gas inlet and a gas outlet. A recuperator has a plurality of inlet flow channels and a plurality of outlet flow channels. The inlet and outlet flow channels are disposed in heat exchange relationship one to the other. Each of the inlet flow channels and each of the outlet flow channels has a respective inlet end and a respective outlet end. An aftercooler fluidly communicates with the recuperator. The aftercooler and the recuperator are adapted to form a unitary structure which is disposed intermediate the first and second headers. The aftercooler includes a plurality of aftercooler flow channels. Each aftercooler flow channel has an inlet end and an outlet end. The aftercooler flow channels are adapted to be in heat exchange relationship with an outside cooling fluid. A first fluid passage extends from the outlet ends of the inlet flow channels of the recuperator to the inlet ends of the aftercooler flow channels. A second fluid passage extends from the outlet ends of the aftercooler flow channels to the inlet ends of the outlet flow channels of the recuperator. The second fluid passage includes a water separator means for removing condensed water from a fluid flowing therethrough. A hot compressed gas is adapted to flow from the gas inlet of the first header through the inlet flow channels of the recuperator, the first fluid passage, the aftercooler flow channels, the second fluid passage, the outlet flow channels of the recuperator, and to the gas outlet of the first header.

The foregoing and other aspects will become apparent from the following detailed description of the invention when considered in conjunction with the accompanying drawing FIGURES.

BRIEF DESCRIPTION OF THE DRAWING FIGURES

DETAILED DESCRIPTION

Figure 1:
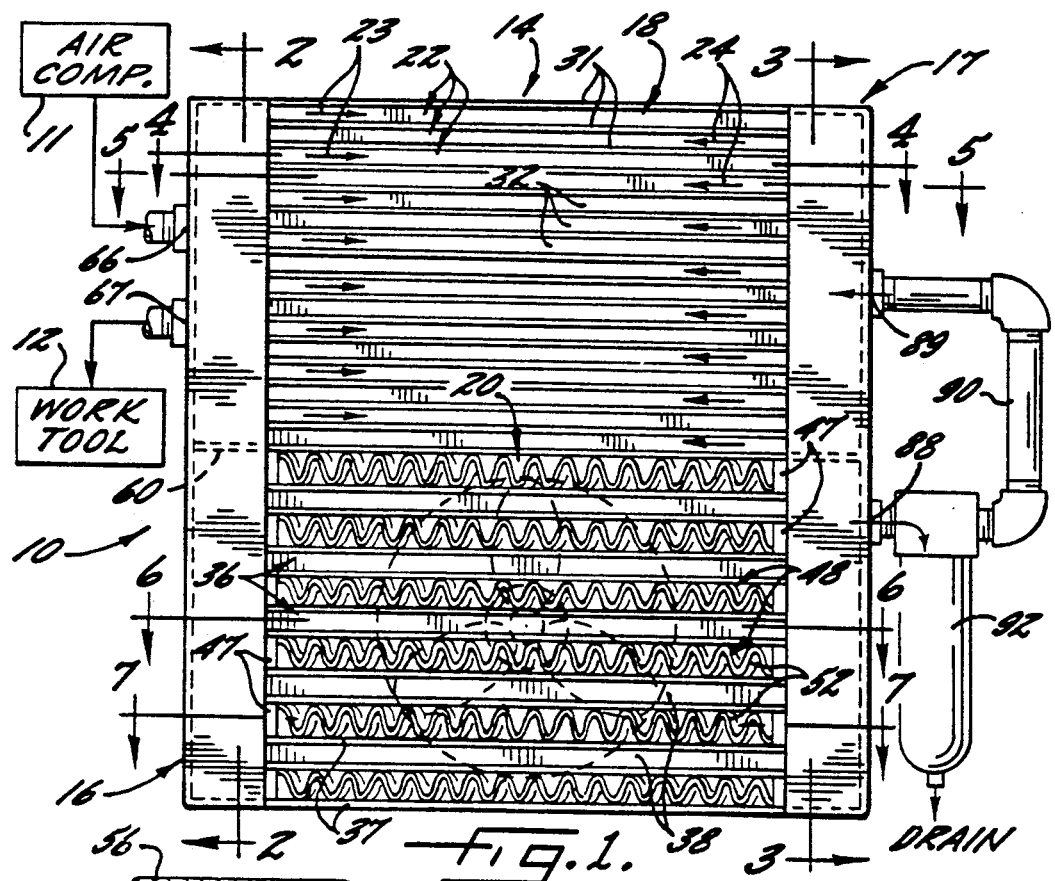
FIG. 1 is a side elevation view illustrating one preferred embodiment of the apparatus of the present invention.
Figure 8:
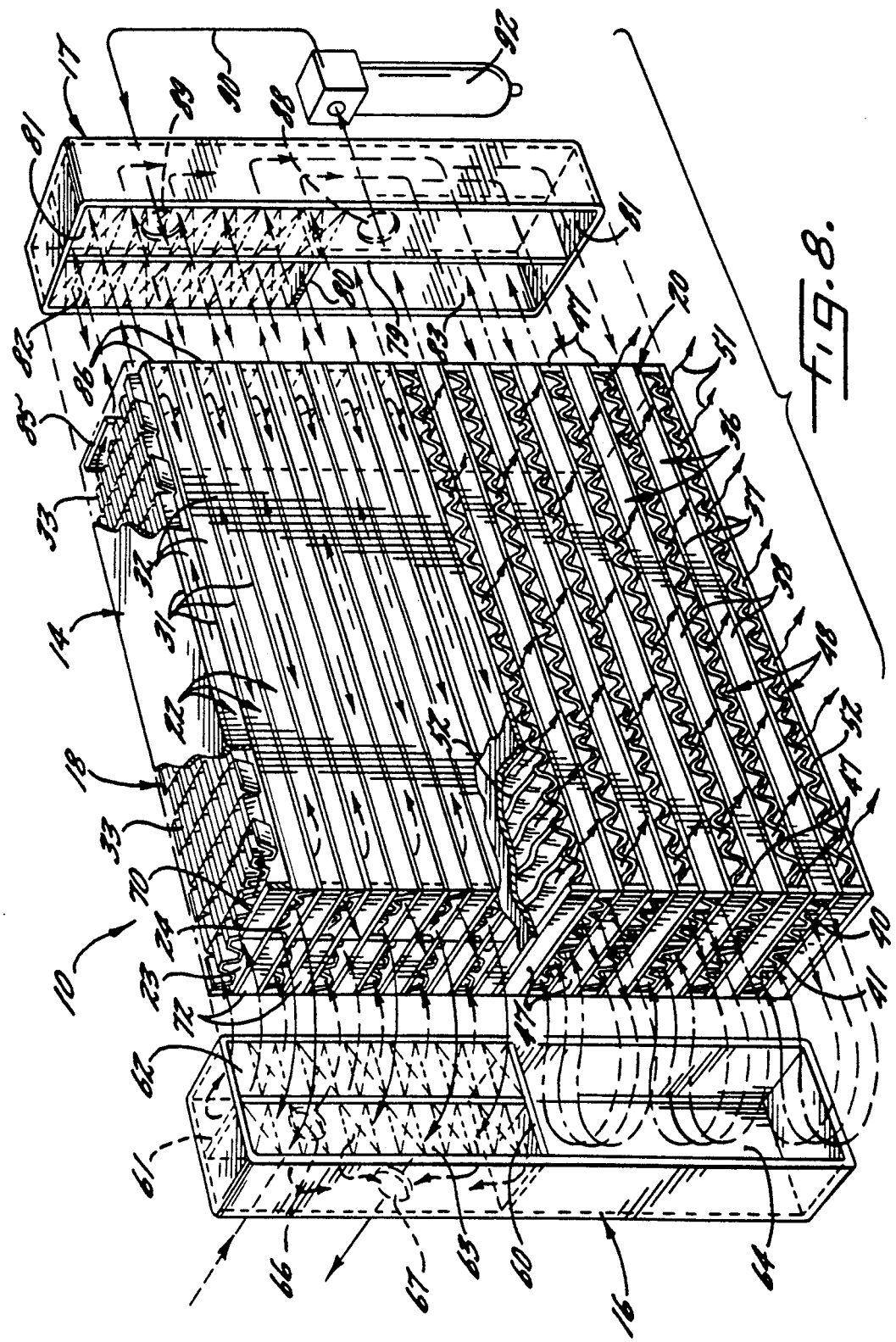
FIG. 8 is an exploded perspective view of the apparatus shown in FIG. 1.
Figure 9:
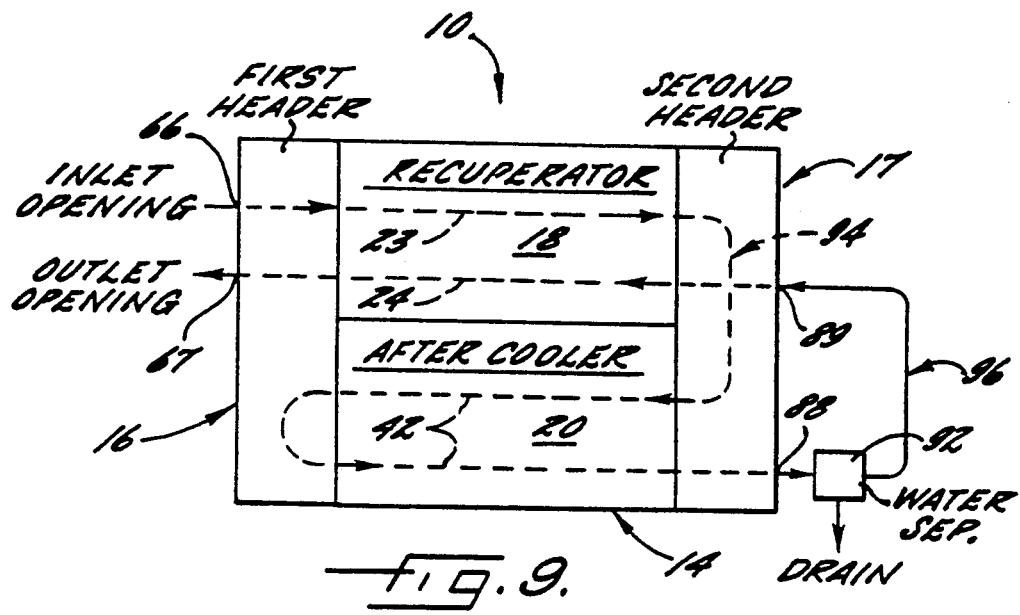
FIG. 9 is a schematic view of the apparatus illustrated in FIGS. 1-8.

Referring more particularly to the drawings, a preferred embodiment of an apparatus embodying the features of the present invention is illustrated at 10 in FIGS. 1, 8 and 9. As illustrated by FIG. 1, the apparatus 10 typically is used in combination with an air compressor 11 in certain applications to remove moisture from the output of the compressor while maintaining the temperature and energy level of the air at nearly the levels present upon leaving the compressor. The removal of water vapor is particularly critical in those situations where the air from the compressor 11 must travel a considerable distance, or travel in very cold temperatures, to a work tool 12, and under conditions where the moisture in the air may condense and/or freeze. Such condensation and/or freezing is particularly unsuitable in applications, such as abrasive blasting, for example, where the application of a uniformly dry abrasive is necessary to achieve satisfactory performance.

As best seen in FIG. 8, the apparatus 10 is defined by a unitary rigid structure which includes a central core 14, and a pair of headers 16 and 17 which are joined on respective opposite sides of the central core 14. The central core 14 is of generally box-like configuration, and typically measures about 2 feet in length and height, and about 2½ inches in lateral thickness. The central core 14 includes an upper recuperator 18 and a lower aftercooler 20. However, it should be understood, that the central core 14 may be significantly larger or smaller than the aforementioned dimensions to meet any desired capacity requirements.

Figure 4:
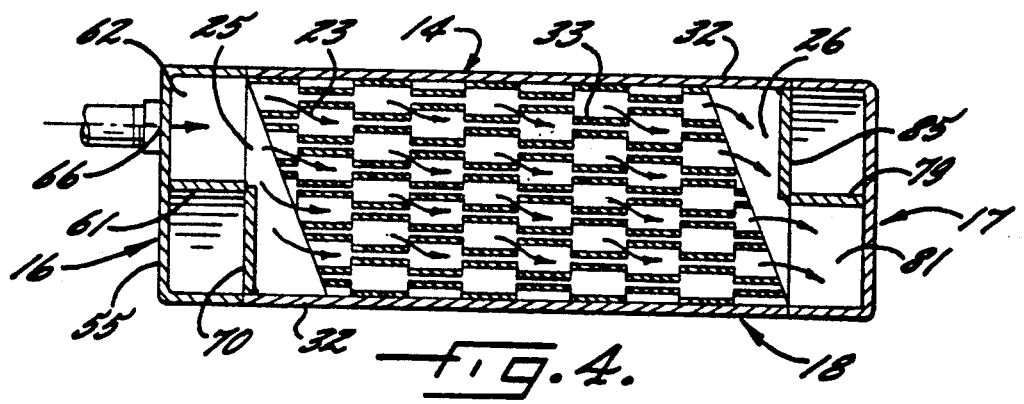
Figure 5:
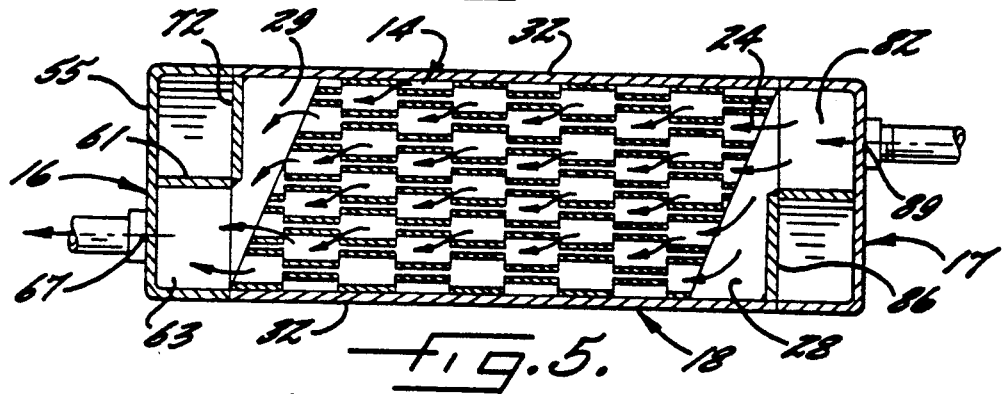

The recuperator 18 of the central core 14 includes a plurality of vertically stacked tube assemblies 22 which each define a flow channel which extends the length of the central core. The flow channels of the vertically stacked tube assemblies 22 direct fluid in a predetermined direction, within the recuperator 18, as best seen by the arrows illustrated in FIG. 8. In this regard, vertically alternating flow channels are herein defined as inlet flow channels 23, note FIG. 4, and vertically intervening flow channels are herein defined as outlet flow channels 24, note FIG. 5. The inlet flow channels 23 each have an inlet end 25 which is on the left as seen in FIG. 4, and an outlet end 26 on the right as seen in FIG. 4. The outlet flow channels 24 each have an inlet end 28 which is on the right as seen in FIG. 5, and an outlet end 29 on the left as seen in FIG. 5.

As illustrated in FIGS. 1 and 8, each of the inlet flow channels 23 and each of the outlet flow channels 24 include a pair of parallel flat plates 31 which are vertically spaced, one to the other, to define an upper and a lower side of the flow channel. Additionally, each of the inlet flow channels 23 and each of the outlet flow channels 24 include a pair of laterally spaced apart bars 32 which support the plates 31 in a separated parallel relationship, and which define opposite sides of the flow channel. Further, a means for imparting turbulence to the air flowing through the flow channels 24, such as turbulator 33, is disposed in the opening defined between the two plates 31 and the two bars 32 of each flow channel. The turbulator 33 is of known construction, and as best seen in FIGS. 4, 5 and 8, it includes a plurality of sinusoidal plate sections which are laterally offset, one to the other, so as to impart turbulence to the air flowing therethrough to thereby improve heat transfer between the flowing air and the turbulator, and thus the top and bottom plates of the channel. Also, the opposite ends of the turbulators 33 are inclined, as seen in FIGS. 4 and 5, to permit lateral flow of the air at the inlet and outlet ends of the channels, as more completely described below. It will also be noted that the plates 31 of vertically adjacent channels consist of a common member, so that heat is readily transferred between adjacent flow channels by conduction.

Figure 6:
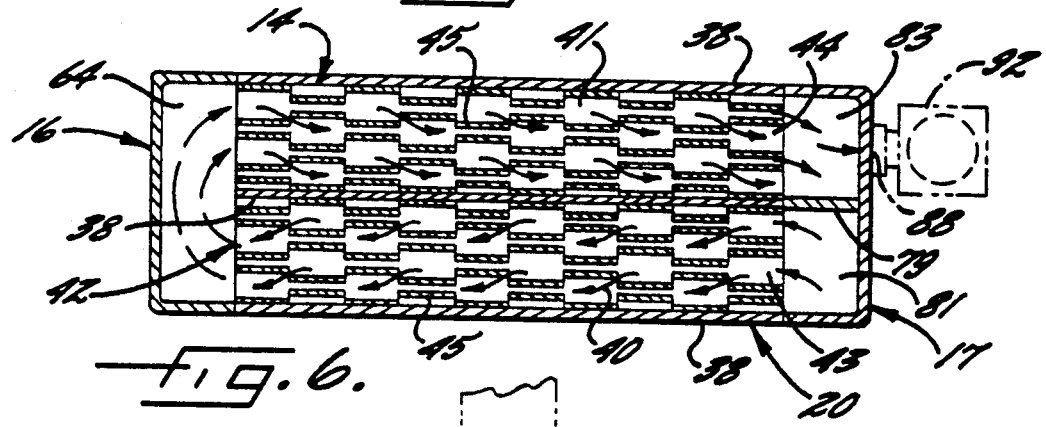

As seen by reference to FIGS. 6 and 8, the aftercooler 20 of the central core 14 includes a plurality of vertically spaced apart tube assemblies 36 which each include two parallel and vertically separated plates 37, and three separator bars 38 which are disposed between the plates 37 thereby defining two laterally adjacent flow channel sections 40 and 41, respectively, note FIG. 6. Also, each pair of laterally adjacent flow channel sections 40 and 41 defines a U-shaped aftercooler flow channel 42, which has an inlet end 43 and an outlet end 44, which are both on the right side of the central core 14 as seen in FIG. 6. Each flow channel section 40 and 41 further includes a turbulator 45 as described above, for causing turbulence in the air flowing therethrough to thereby improve the heat transfer.

Figure 7:
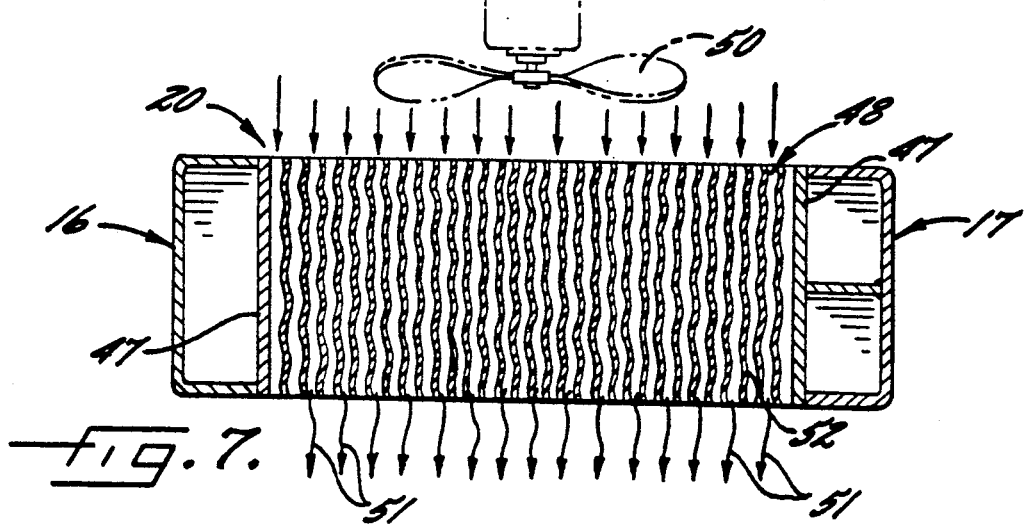

The vertically adjacent tube assemblies 36 of the aftercooler 20 are vertically separated by separator bars 47 which run generally perpendicularly to the direction of the bars 38 and the flow channel sections 40 and 41. This configuration defines cooling flow channels 48, note FIG. 7, which extend through the aftercooler 20 generally perpendicularly to the direction of the aftercooler flow channel sections 40 and 41, and which are adapted to have a cooling fluid, such as ambient air, passed therethrough, such as by a fan 50, for example, as best illustrated schematically by the arrows 51 in FIGS. 7 and 8. The air flowing in the aftercooler flow channel sections is thereby cooled. Also, a turbulator 52 is disposed in the space defined by the plates 37 of the adjacent tube assemblies 36 and the separator bars 47, again for the purpose of improving heat transfer between the cooling air stream 51 and the air flowing through the aftercooler flow channels 42. In the illustrated embodiment, the turbulators 52 include metal plates which are crimped into a non-regular sinusoidal configuration.

The plates, bars, and turbulators of the recuperator 18 and the aftercooler 20, as described above, are preferably fabricated from an aluminum alloy which is coated with pure aluminum which melts at a temperature lower than that of the alloy. The entire central core, including the recuperator 18 and the aftercooler 20, may then be brazed to form a unitary rigid structure, by heating the assembly to a temperature above the melting point of the aluminum coating but below the melting point of the aluminum alloy. Accordingly, the aluminum coating melts and forms a solder-like connection between contiguous parts, upon cooling.

Figure 2:
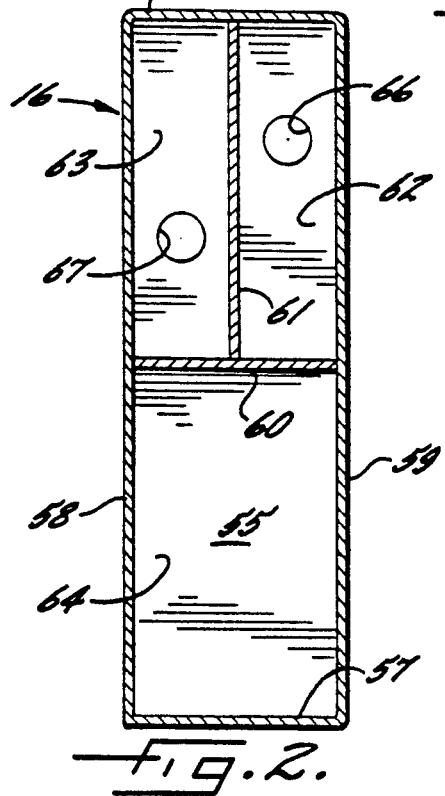
FIGS. 2-7 are sectional views taken substantially along the lines 2—2, 3—3, 4—4, 5—5, 6—6, and 7—7 of FIG. 1, respectively.

As best seen in FIGS. 2 and 8, the header 16 has an outline which conforms to the outline of the end face of the central core 14. The header 16 includes a base plate 55, upper and lower end plates 56 and 57, respectively, and opposite side plates 58 and 59. A horizontal divider plate 60 extends between the side plates and is aligned with the juncture of the recuperator 18 and aftercooler 20 sections of the central core 14. Also, a vertical divider plate 61 extends between the upper end plate 56 and the divider plate 60. The end plates 56 and 57, the side plates 58 and 59, and the divider plate 60 are mounted to one side of the base plate 55 to define an inlet plenum 62, an outlet plenum 63, and a reversing plenum 64 for the purposes described below. Also, an inlet opening 66 communicates with the inlet plenum 62, and an outlet opening 67 communicates with the outlet plenum 63. The inlet and outlet openings 66 and 67, respectively, are adapted for connection with the compressor 11 and the work tool 12, respectively.

As seen in FIGS. 4 and 8, a baffle plate 70 is positioned to close communication between the inlet end 25 of each inlet flow channel 23 and the outlet plenum 63. Thus, air entering from the inlet plenum 62 is free to enter on one side of the inlet end 25 of each inlet flow channel 23 and flow therethrough to the outlet end 26. Similarly, and as seen in FIGS. 5 and 8, a baffle plate 72 is positioned to close communication between the outlet end 29 of each outlet flow channel 24 and the inlet plenum 62. Thus, air passing through an outlet flow channel is free to enter the outlet plenum 63 of the header 16.

Figure 3:
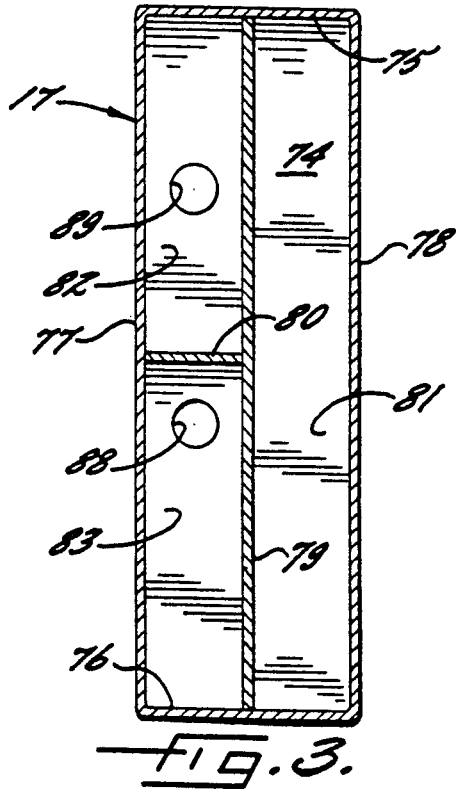

As seen in FIG. 3, the opposite header 17 has an outline which conforms to that of the header 16. Header 17 includes a base plate 74, upper and lower end plates 75 and 76, respectively, and opposite side plates 77 and 78, respectively. A vertical divider plate 79 extends between the upper and lower end plates 75 and 76, and a horizontal divider plate 80 extends between the side plate 77 and the vertical divider plate 79. This configuration defines a transfer plenum 81, an upper return plenum 82, and a lower receiving plenum 83.

As seen in FIGS. 4 and 5, a baffle plate 85 is positioned to close communication between the outlet end 26 of each inlet flow channel 23 and the return plenum 82, so that the air passing through each inlet flow channel is free to enter the transfer plenum 81. Similarly, a baffle plate 86 is positioned to close communication between the inlet end 28 of each outlet flow channel 24 and the transfer plenum 81, so that air entering the inlet end 28 of each outlet flow channel 24 passes therethrough to the outlet plenum 63.

An outlet 88 communicates with the receiving plenum 83, and another outlet 89 communicates with the return plenum 82. These two outlets are interconnected by means of a U-shaped tubular connector 90 which is mounted on the side of the header 17 opposite the central core 14, and so as to permit passage of the air from the receiving plenum 83 to the return plenum 82. A centrifugal water separator 92, of conventional design, is positioned in the connector 90 to remove entrained water droplets from the air stream. The water separator 92 may include a small opening in the bottom thereof to permit the condensed water to drain from the separator, or the separator 92 may incorporate an automatic drain with a float valve (not shown) of conventional design.

In the embodiment of FIGS. 1-8, the recuperator 18 and the aftercooler 20 are mounted on each other to form a unitary box-like central core 14, with the recuperator above the aftercooler, and such that the inlet flow channels 23, outlet flow channels 24, and aftercooler flow channels 42 are disposed parallel, one to each other. The headers 16 and 17 are mounted on respective opposite sides of the unitary central core 14. Also, the aftercooler flow channels 42 will be seen to be of U-shaped outline, with the inlet ends 43 communicating with the transfer plenum 81 and the outlet ends 44 communicating with the receiving plenum 83. The transfer plenum 81 of the second header 17 defines a first flow passage 94 (note FIG. 9) extending from the outlet ends of the inlet flow channels 23 to the entry ends of the aftercooler flow channels 42. A second flow passage 96 is defined by the connector 90 and extends from the outlet ends of the aftercooler flow channels 42 and the receiving plenum 83 to the return plenum 82 and the inlet ends of the outlet flow channels 24. The second flow passage 96 includes the water separator 92.

In use, hot compressed air from the compressor 11 enters the apparatus 10 through the opening 66 of the header 16 and flows into the inlet plenum 62. From the inlet plenum 62, the compressed air flows through the inlet flow channels 23 to the transfer plenum 81. As should be understood, the inclined ends of the turbulators 33, as best seen in FIG. 4, permit the air to flow laterally across the full width of the flow channels 23, and then to be directed laterally at the outlet end 26 of the flow channels 23 and into the transfer plenum 81. The compressed air then flows downwardly through the transfer plenum 81 and enters the inlet ends 43 of the aftercooler flow channels 42. The compressed air then flows through the first channel section 40 and into the reversing plenum 64 in the first header 16, which causes the compressed air to reverse direction and flow back to the receiving plenum 83 of the second header 17 through the second flow channel section 41. The compressed air is cooled during passage through the aftercooler flow channels 42 by reason of the cooling air stream 51 which is flowing through the transverse flow channels 48. More particularly, the heat energy from the compressed air is transferred by conduction to the turbulator 52 positioned in each of the transverse flow channels 48, and the moving air stream 51 serves to withdraw this heat.

The relatively cool compressed air is then passed through the water separator 92 which serves to remove a high percentage of the condensed water, and the air continues to the return plenum 82 and the inlet ends 28 of the outlet flow channels 24. Upon passing through the outlet flow channels 24, the relatively cool air is heated by heat exchange contact with the entering hot compressed air in the channels 23, and the entering hot compressed air is accordingly cooled. The air from the outlet flow channels 24 then enters the outlet plenum 63, and passes through the outlet opening 67 to the work tool 12. During reheating of the air during passage through the outlet flow channels 24, the relative humidity drops, which tends t prevent the remaining water vapor from condensing in the work tool 12.

In the embodiment of FIGS. 1-8, the aftercooler flow channels 42 are of U-shaped outline and are composed of laterally adjacent channel sections 40 and 41 which direct the flow in opposite directions. However, it should be understood that the two channel sections 40 and 41 could be vertically separated, as schematically illustrated in FIG. 9, with for example, all of the channel sections 40 being above all of the channel sections 41.

Figure 10:
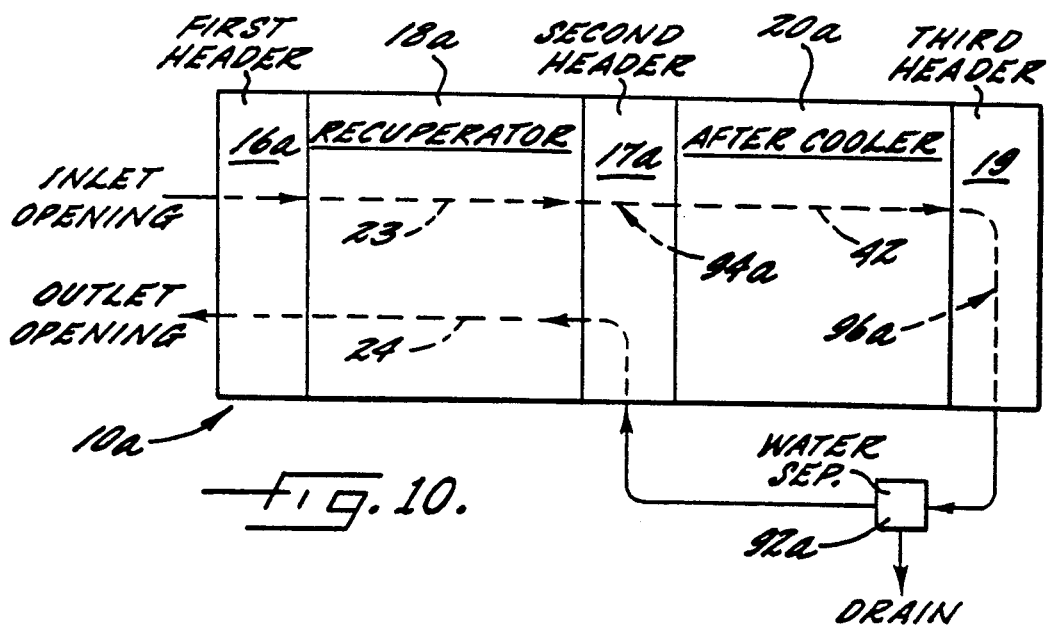
FIG. 10 is a schematic view of a further embodiment of the invention.

FIG. 10 schematically illustrates another embodiment of the present invention, and wherein the aftercooler 20a is of single pass design. Specifically, the recuperator 18a and the aftercooler 20a include separate box-like core members as described above, but with the aftercooler flow channels 42a each comprising a single channel as opposed to two laterally adjacent channel sections. Also, the recuperator 18a and the aftercooler 20a are mounted in a laterally spaced apart arrangement, with all of the flow channels being parallel to each other. A first header 16a is mounted on one side of the recuperator 18a, a second header 17a is mounted between the other side of the recuperator and one side of the aftercooler 20a, and a third header 19 is mounted on the other side of the aftercooler. The second header 17a defines a first flow passage 94a extending from the outlet ends of the inlet flow channels 23a to the inlet ends of the aftercooler flow channels 42a, and the third header 19 defines a portion of a second flow passage 96a which extends from the outlet ends of the aftercooler flow channels 42a to the inlet ends of the outlet flow channels 24a. The water separator 92a is positioned in the second flow passage 96a externally of the second and third headers.

While this invention has been illustrated and described in accordance with a preferred embodiment, it is recognized that variations and changes may be made therein without departing from the invention as set forth in the following claims.

Having described the invention, what is claimed is:

1. A dehumidification apparatus for use in a fluid system, the dehumidification apparatus comprising:

first and second headers, the first header including a gas inlet and a gas outlet;

a recuperator having a plurality of inlet flow channels and a plurality of outlet flow channels, the inlet and outlet flow channels being disposed in heat exchange relationship one to the other, each of the inlet flow channels and each of the outlet flow channels having a respective inlet end and a respective outlet end;

an aftercooler fluidly communicating with the recuperator, the aftercooler and the recuperator adapted to form a unitary structure which is disposed intermediate the first and second headers, the aftercooler including a plurality of aftercooler flow channels, each aftercooler flow channel having an inlet end and an outlet end, the aftercooler flow channels adapted to be in heat exchange relationship with an outside cooling fluid;

a first fluid passage extending from the outlet ends of the inlet flow channels of the recuperator to the inlet ends of the aftercooler flow channels; and a second fluid passage extending from the outlet ends of the aftercooler flow channels to the inlet ends of the outlet flow channels of the recuperator, the second fluid passage including a water separator means for removing condensed water from a fluid flowing therethrough, and wherein a hot compressed gas is adapted to flow from the gas inlet of the first header through the inlet flow channels of the recuperator, the first fluid passage, the aftercooler flow channels, the second fluid passage, the outlet flow channels of the recuperator, and to the gas outlet of the first header.

2. An apparatus for removing moisture from a hot compressed gas, the apparatus comprising:

a recuperator having a plurality of inlet flow channels and a plurality of outlet flow channels, the inlet and outlet flow channels being disposed in heat exchange relationship one to the other, each of the inlet flow channels and each of the outlet flow channels having a respective inlet end and a respective outlet end;

an aftercooler fluidly communicating with the recuperator, the aftercooler and the recuperator adapted to form a unitary structure, the aftercooler including a plurality of aftercooler flow channels, each aftercooler flow channel having an inlet end and an outlet end, the aftercooler flow channels adapted to be in heat exchange relationship with an outside cooling fluid;

a header apparatus mounted on the unitary structure, the header apparatus fluidly communicating with the recuperator and the aftercooler;

gas inlet means for fluidly communicating with the header apparatus;

gas outlet means for fluidly communicating with the header apparatus;

a first flow passage extending from the outlet ends of the inlet flow channels to the inlet ends of the aftercooler flow channels;

a second flow passage extending from the outlet ends of the aftercooler flow channels to the inlet ends of the outlet flow channels; and a means for separating water disposed in the second flow passage, and wherein a hot compressed gas is adapted to flow from the gas inlet means through the inlet flow channels of the recuperator, the first flow passage, the aftercooler flow channels, the second flow passage, the outlet flow channels of the recuperator, and the gas outlet means.

3. The apparatus as claimed in claim 2, and wherein the recuperator and the aftercooler are mounted such that the inlet flow channels of the recuperator, the outlet flow channels of the recuperator, and the aftercooler flow channels are disposed in parallel relationship one to each other.

4. The apparatus as claimed in claim 2, and wherein the header apparatus includes first and second header structures mounted on respective opposite sides of the unitary structure, and wherein the gas inlet means and the gas outlet means fluidly communicate with the first header structure.

5. The apparatus as claimed in claim 2, and wherein the recuperator and the aftercooler define separate core members which are mounted in a spaced apart arrangement, and such that the inlet flow channels, the outlet flow channels, and the aftercooler flow channels are parallel to each other, and wherein the header apparatus includes a first header mounted on one side of the recuperator, a second header mounted between the other side of the recuperator and one side of the aftercooler, and a third header mounted on the other side of the aftercooler.

6. The apparatus as claimed in claim 2, and wherein the recuperator includes a plurality of flat plates disposed in a vertically spaced apart arrangement, and wherein a pair of laterally spaced apart bars are positioned between each adjacent pair of the flat plates thereby defining one of the inlet and outlet flow channels between each adjacent pair of the plates, the inlet and outlet flow channels alternating with respect to each other in the vertical direction.

7. The apparatus as claimed in claim 6, and wherein the aftercooler includes a plurality of pairs of flat plates disposed in a vertically spaced apart arrangement, and wherein at least two laterally spaced apart separator bars are positioned between the plates of each pair thereby defining at least a portion of the aftercooler flow channels between each pair of the plates, and wherein a separator apparatus is disposed between adjacent pairs of the plates to maintain the pairs in a vertically separated relationship thereby defining transverse flow channels therebetween for the passage of a flow of cooling fluid therethrough.

8. The apparatus as claimed in claim 7, and wherein the recuperator further includes a first turbulator which is disposed in each of the inlet and outlet flow channels for causing turbulence in the gas flowing therethrough.

9. The apparatus as claimed, in claim 8, and wherein the aftercooler includes a second turbulator which is disposed in each of the aftercooler flow channels for causing turbulence in the gas flowing therethrough.

10. The apparatus as claimed in claim 9, and wherein the aftercooler includes a third turbulator which is disposed in each of the transverse flow channels between the pairs of plates for causing turbulence in the cooling fluid passing therethrough.

11. An apparatus for removing moisture from a hot compressed gas comprising:

first and second spaced apart headers, with the first header including a gas inlet and a gas outlet;

a central core mounted intermediate the first and second headers, the central core including a recuperator and an aftercooler, the recuperator having a plurality of inlet flow channels and a plurality of outlet flow channels which extend in opposite directions between the first and second headers and in heat exchange relationship with each other, each of the inlet flow channels having an inlet end and an outlet end and each of the outlet flow channels having an inlet end and an outlet end, with the inlet ends of the inlet flow channels communicating with the gas inlet of the first header, and with the outlet ends of the outlet flow channels communicating with the gas outlet of the first header, and the aftercooler including a plurality of aftercooler flow channels, each aftercooler flow channel having an inlet end and an outlet end, the aftercooler flow channels adapted to be in direct heat exchange relationship with an outside cooling fluid;

a first flow passage extending from the outlet ends of the inlet flow channels of the recuperator to the inlet ends of the aftercooler flow channels; and a second flow passage extending from the outlet ends of the aftercooler flow channels to the inlet ends of the outlet flow channels of the recuperator, the second flow passage including a water separator for removing condensed water from a fluid flowing therethrough, whereby a hot compressed gas is adapted to flow from the gas inlet through the inlet flow channels of the recuperator, the first flow passage, the aftercooler flow channels, the second flow passage, the outlet flow channels, and to the gas outlet, and whereby the hot compressed gas is cooled upon passing through the inlet flow channels and the aftercooler flow channels to facilitate removal of any water vapor by the water separator, and the gas is reheated upon passing through the outlet flow channels.

12. The apparatus as claimed in claim 11, and wherein the inlet and outlet ends of the aftercooler flow channels are located adjacent the second header.

13. The apparatus as claimed in claim 12, and wherein the aftercooler flow channels include a first flow channel section extending from the second header to the first header, and a second flow channel section extending from the first header to the second header.

14. The apparatus as claimed in claim 13, and wherein the first flow passage extends through the second header.

15. The apparatus as claimed in claim 14, and wherein the second flow passage includes at least a portion thereof which extends outside of the second header, and such that the water separator is outside of the second header.

16. An apparatus for removing moisture from a hot compressed gas comprising:

a first header including a wall which defines an inlet plenum, an outlet plenum, and a reversing plenum;

a gas inlet communicating with the inlet plenum and adapted for connection to a source of a hot compressed gas, and a gas outlet communicating with the outlet plenum and adapted for connection with an object of interest;

a second header including a wall which defines a transfer plenum, a return plenum, and a receiving plenum;

a central core mounted between the first and second headers, the central core including, (a) a recuperator including a plurality of inlet flow channels which extend from the inlet plenum of the first header to the transfer plenum of the second plenum, and a plurality of outlet flow channels which extend from the return plenum of the second header to the outlet plenum of the first header, the inlet flow channels and the outlet flow channels being disposed in heat exchange relationship with each other, and (b) an aftercooler including a plurality of first flow channel sections which extend from the transfer plenum of the second header to the reversing plenum of the first header, and a plurality of second flow channel sections which extend from the reversing plenum of the first header to the receiving plenum of the second header, and wherein a heat exchange apparatus contacts each of the first and second flow channel sections, the heat exchange apparatus being adapted to be in direct heat exchange relationship with an outside cooling fluid so as to cool the first and second flow channel sections; and a fluid conduit extending from the receiving plenum of the second header to the return plenum of the second header, and including water separator means for removing entrained water droplets from a gas passing therethrough.

17. The apparatus as claimed in claim 16, and wherein the recuperator comprises a plurality of flat plates disposed in a vertically spaced apart arrangement, and a pair of laterally spaced apart separator bars positioned between each adjacent pair of the plates so as to define one of the inlet and outlet flow channels between each adjacent pair of the plates, and with the inlet and outlet flow channels alternating with respect to each other in the vertical direction.

18. The apparatus as claimed in claim 17, and wherein the aftercooler comprises a plurality of pairs of flat plates disposed in a vertically spaced apart arrangement, and three laterally spaced apart separator bars positioned between the plates of each pair so as to define one of the first flow channel sections and one of the second flow channel sections between each pair of the plates, and wherein a separator is disposed between adjacent pairs of the plates to maintain the pairs in a vertically separated relationship and so as to define transverse flow channels therebetween for the receipt of a flow of cooling fluid therethrough.

19. The apparatus as defined in claim 18, and wherein the recuperator includes a first turbulator disposed in each of the inlet and outlet flow channels for causing turbulence in the gas flowing therethrough.

20. The apparatus as claimed in claim 19, and wherein the aftercooler includes a second turbulator disposed in each of the first and second flow channel sections for causing turbulence in the gas passing therethrough.

21. The apparatus as claimed in claim 20, and wherein the aftercooler includes a third turbulator disposed in each of the transverse flow channels between the pairs of plates for causing turbulence in the cooling fluid passing therethrough.

22. A fluid system comprising:

a means for compressing a gas;

first and second headers, the first header including a gas inlet and a gas outlet, the gas inlet disposed in fluid receiving relation with the gas compressing means;

a recuperator having a plurality of inlet flow channels and a plurality of outlet flow channels, the inlet and outlet flow channels being disposed in heat exchange relationship one to the other, each of the inlet flow channels and each of the outlet flow channels having a respective inlet end and a respective outlet end;

an aftercooler fluidly communicating with the recuperator, the aftercooler and the recuperator adapted to form a unitary structure which is disposed intermediate the first and second headers, the aftercooler including a plurality of aftercooler flow channels, each aftercooler flow channel having an inlet end and an outlet end, the aftercooler flow channels adapted to be in heat exchange relationship with an outside cooling fluid;

a first fluid passage extending from the outlet ends of the inlet flow channels of the recuperator to the inlet ends of the aftercooler flow channels;

a second fluid passage extending from the outlet ends of the aftercooler flow channels to the inlet ends of the outlet flow channels of the recuperator, the second fluid passage including a water separator means for removing condensed water from a fluid flowing therethrough; and a fluid powered device disposed in fluid receiving relation with the gas outlet, and wherein a hot compressed gas is adapted to flow from the gas compressing means to the gas inlet of the first header through the inlet flow channels of the recuperator, the first fluid passage, the aftercooler flow channels, the second fluid passage, the outlet flow channels of the recuperator, the gas outlet of the first header and to the fluid powered device.

* * * * *